United States Patent
Wen et al.

(10) Patent No.: US 7,409,444 B2
(45) Date of Patent: Aug. 5, 2008

(54) METHOD AND APPARATUS FOR MANAGING BUSINESS CELL PHONE USAGE

(75) Inventors: Chih-Po Wen, Redwood City, CA (US); Charles L. Marker, II, Los Altos Hills, CA (US); Constantin S. Delivanis, Los Altos Hills, CA (US); Arvind Sharma, Menlo Park, CA (US)

(73) Assignee: BDNA Corporation, Mountain View, CA (US)

( * ) Notice: Subject to any disclaimer, the term of this patent is extended or adjusted under 35 U.S.C. 154(b) by 492 days.

(21) Appl. No.: 10/842,844

(22) Filed: May 10, 2004

(65) Prior Publication Data

US 2005/0250470 A1  Nov. 10, 2005

(51) Int. Cl.
*G06F 13/00* (2006.01)

(52) U.S. Cl. .................... 709/224; 709/219; 709/225

(58) Field of Classification Search ................ 709/219, 709/223, 224, 225, 237
See application file for complete search history.

(56) References Cited

U.S. PATENT DOCUMENTS

| 5,625,669 | A | * | 4/1997 | McGregor et al. ........... 455/418 |
|---|---|---|---|---|
| 5,684,861 | A | * | 11/1997 | Lewis et al. .................. 455/405 |
| 5,726,660 | A | * | 3/1998 | Purdy et al. ............... 342/357.1 |
| 6,553,240 | B1 | * | 4/2003 | Dervarics ..................... 455/566 |
| 6,570,596 | B2 | * | 5/2003 | Frederiksen ................. 715/808 |
| 6,738,813 | B1 | * | 5/2004 | Reichman ..................... 709/224 |
| 7,200,392 | B2 | * | 4/2007 | Kennedy et al. ............. 455/423 |
| 2002/0022472 | A1 | * | 2/2002 | Watler et al. ................. 455/405 |
| 2003/0115200 | A1 | * | 6/2003 | Anthony et al. ................ 707/10 |
| 2003/0140089 | A1 | * | 7/2003 | Hines et al. .................. 709/202 |

* cited by examiner

*Primary Examiner*—Viet Vu
(74) *Attorney, Agent, or Firm*—Ronald Craig Fish (57) ABSTRACT

A process and apparatus to remotely gather data about cellphone hardware and software configurations and usage. The system uses agents which are resident on the phones and which can be remotely launched by a data collection server by sending a message to a public IP address of the phone and addressed to a special port designated for launch. The agent specifies the launch port and a data collection port upon installation and registration with the cellphone operating system. Data on hardware configuration, software version and phone usage can be gathered. Data collection sessions are established by the data collection server sending a message addressed to the public IP address of the cellphone and the data collection port specified by the agent process upon registration with the operating system. Many alternative embodiments are also disclosed.

18 Claims, 7 Drawing Sheets

METHOD AND APPARATUS FOR MANAGING BUSINESS CELL PHONE USAGE

FIELD OF USE AND BACKGROUND OF THE INVENTION

Many businesses give cell phones to their employees for business usage. The IT department wants to keep track of which software version is installed in each phone and what types of phones are in the hands of their employees. They want to know this for compatibility of ugrades to the phones and to know which phones, if any, need upgrades or to which new software can be downloaded. The company may also want to monitor usage of the phones so as to allocate budget usage amounts to its various departments. It may also want to monitor usage to make sure most usage is business related.

As far as the inventor is aware, the prior art has no convenient solution to this problem. Currently, the company will get multiple paper cell phone bills, each indicating the cell phone number of the phone being used and the phone numbers called and the minutes consumed. No indication of the phone's software version or make and model is included on these bills. No indication of which phone number is assigned to each department is included on these bills. The IT department would have to manually look up the software and hardware version for each phone and would have to determine manually from paper records which phones are assigned to which employees and which departments they are in. Then, the accounting department would have to group the bills into groups by department manually and add up the usage minutes manually. All this is time consuming and labor intensive and not attractive to IT departments or accounting departments of big and medium size companies.

Further, these bills come to the company on a monthly basis, and are not available on an as-needed, when-needed basis.

Accordingly, a need has arisen to gather information electronically from the phones themselves and collect and store that information in a database such that further inquiries can be made by mining the data in the database. Preferably, the information will be gathered on an as-needed, when-needed basis.

SUMMARY OF THE INVENTION

The teachings of the invention define a genus of cellphone processes and a genus of collection server processes defined as follows. Before the process genus can be defined however, it is necessary to consider the following precondition which must be true before any species within the genus can execute.

A) an agent program (or some operating system functionality which can perform the functions of the agent program described herein—which will hereafter be referred to as the OS agent function) must be resident or remotely installed on a cellphone before data about said cellphone is to be gathered.

The genus of the cellphone process is defined by the following steps:

1) launching the agent process (or some operating system functionality which can perform the functions of the agent program described herein) in any way and collecting data about a cellphone;

2) establishing a data collection session with a data collection server in any way;

3) sending the data to the collection server in any way.

There is a preferred subgenus within this genus where all species have agents (or some operating system functionality which can perform the functions of the agent program described herein) which are remotely launched by the collection server which then initiates a data collection session. In this subgenus, there is one precondition to the process. That precondition is that the agent program, if an agent program is used as opposed to an operating system function, must register with the operating system of the phone upon installation and designate a launch port which if any message is received addressed to that launch port will cause the agent program to be launched. In embodiments where the functions of the agent are performed by some operating system agent function, the operating system must be configured such that whenever a message is received directed to a particular port associated with the OS agent function, the operating system will launch the OS agent function.

The cellphone process preferred subgenus is defined by the following functions that all species within the subgenus will perform:

1) when a message is received which is addressed to said launch port, said agent program or OS agent function is launched;

2) the agent or OS agent function monitors a data collection port for a message from a data collection server;

3) when a message is received at said data collection port, the agent or OS agent function sends back data about the phone.

Various species within this genus vary in the following ways. One species only launches the agent or OS agent function if the phone is not in use to make or receive a call. Another species allows the agent or OS agent function to be invoked, gather data and report back even while the phone is in use. Another species has the agent or OS agent function gathering all available data that can be gathered and sending it all back to the collection server when a message is received at the data collection port. Another embodiment gathers only data specified in the message received at the data collection port and sends only that data back to the collection server. Another embodiment gathers all the available data by the agent or OS agent function but sends back only data requested by the data collection server. Another species sends back a handshake message when a message is received at the data collection port. Another species specifies both the launch port and the data collection port upon registration. Another species specifies only the launch port upon registration and the data collection port is established by a handshake protocol between the agent or OS agent function and the collection server.

There is a separate invention involving business use of the information gathered by the phone in the collection server, possibly along with other information gathered from other servers such as from the provider's servers or servers of the phone manufacturer or the manufacturer of the phone operating system. For example, a company which provides cell phones to its employees may have business interests regarding use of the data gathered from the phones which can be broadly categorized into the areas of: phone analysis; spending analysis; call analysis; security management; maintenance support; and GPS location. For example, in the area of phone analysis, it is useful to a large company with many phones in the hands of its employees to be able to easily gather information about how many phones are in the hands of its employees, what make and model they are, what operating system and version they have, whether they have any virus protection software installed or not. This information can be used to negotiate with vendors of phones to negotiate package deals or to get subsidized prices on phone handsets from the vendors, determine if standardization on certain features is needed, or determine whether or not the company is spending too much on acquisition of phones, etc. In the area of spending analysis, the company may be interested in determining how much money it is spending on the plans provided with its phones and with which vendors for purposes of negotiating better packages with vendors. In the area of call analysis, the company may be interested in determining the average outgoing and incoming call length distribution and the time of day distribution of calls as well as determining who is being called and who is calling in. This type of information is useful to the company to determine if it has the right package of plans for its phones and could be sold to phone service provider marketing departments for purposes of developing new plans for big and small businesses.

DETAILED DESCRIPTION OF THE PREFERRED AND ALTERNATIVE EMBODIMENTS

Figure 1:
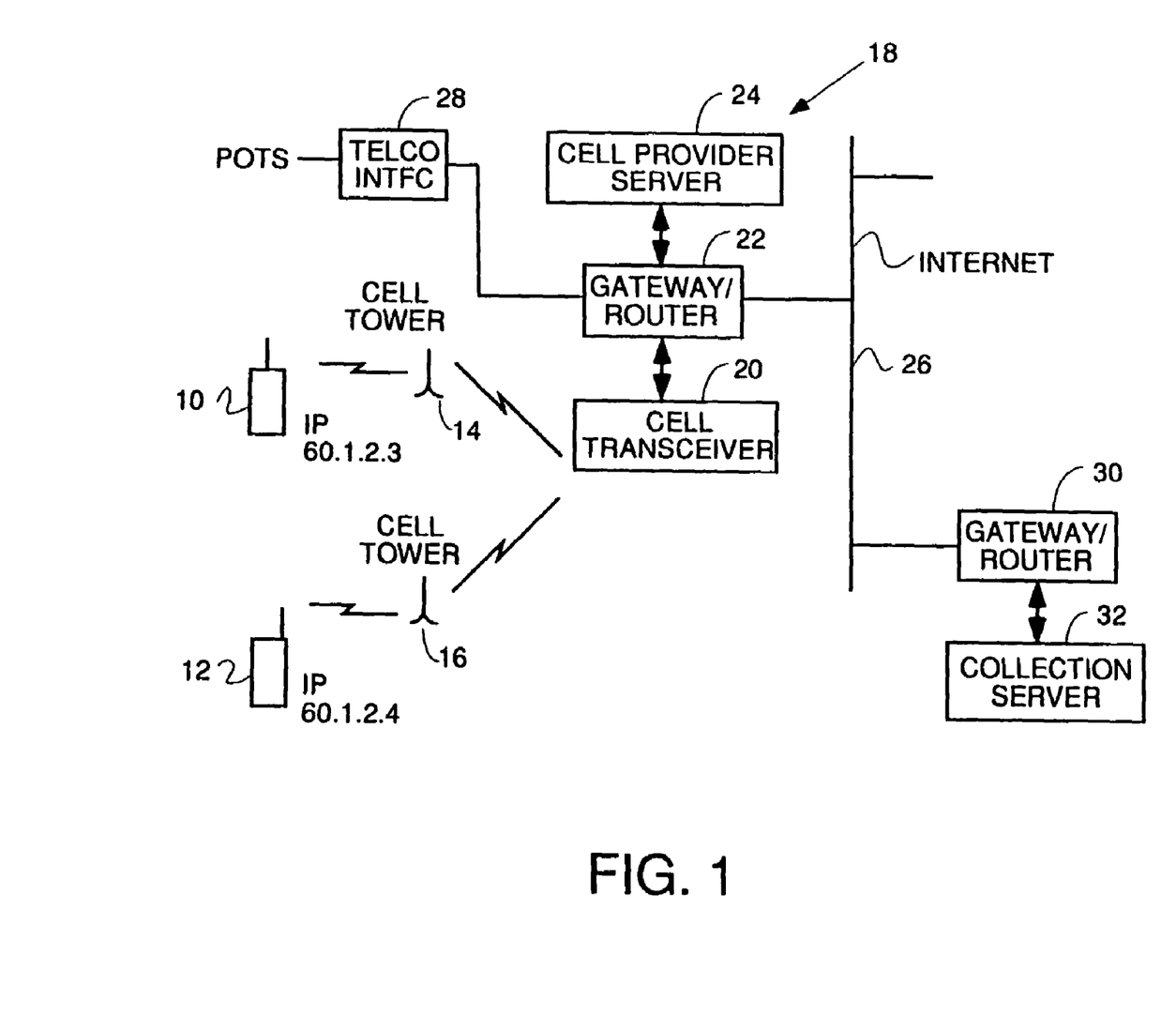
FIG. 1 is block diagram of a typical cellular phone network showing how the data collection server is coupled through the internet to a server at the cellular provider.

Referring to FIG. 1, there is shown a block diagram of a typical cellular system in which the teachings of the invention may be employed. Cell phone 10 and cell phone 12 are each web enabled cell phones. They are each coupled by radio frequency transmissions through a series of cellular towers such as 14 and 16 to the cellular system head end. The head end 18 of the cellular system is well known and typically includes an RF transceiver 20 coupled to a gateway/router 22. The gateway/router 22 is coupled to a server 24, the internet 26, and the conventional telephone company land lines through a telephone company interface 28. Each cellular phone has an IP address which may be globally unique or which may be locally unique within the cellular system and converted to a globally unique IP address through a network address translation (NAT) process carried out in the gateway/router 22.

A gateway/router 30 couples a collection server 32 to the internet 26. The data collection server 32 could also be directly coupled to a local area network to which the provider's server 24 is coupled, but typically it is not and data is transferred over the internet.

The address of the cellphone must be either a globally unique IP address that routers on the internet have in their routing tables, or a network address translation router that couples the providers network to the internet via a globally unique IP address of the NAT router and a NAT address translation table must be used.

In the preferred embodiment, all the cellphone IP addresses are public, but the collection server IP address is private. Thus, collection of data sessions can only be initiated from the collection server 32 in the preferred embodiment and not from the cellphones. In other embodiments, the data collection server has a public IP address and the cellphones can initiate data transfers thereto.

The function of the collection server is to execute a process to collect information from the cell phones which is stored in a database. This database can be mined by the IT and accounting departments of a company that provided the cell phones to its employees to extract information needed by those departments. The collection server carries out this process by carrying out a protocol to be described below to activate a data collection agent in each cellphone it wants to extract information from and receive packets back from each cellphone that contains data about the cellphone and its usage. The server can also associate each cellphone with an individual employee and/or department of the corporation. Information can be gathered from individual cellphones or the entire lot or any subset of the cellphones, and the information can be gathered when needed.

Each cellphone has to be digitally enabled on the cellphone provider's digital data exchange network, and it has to have either a globally unique IP address or a unique local address within the provider's digital network which can be translated by NAT to a globally unique IP address. NAT replaces the source address in each outgoing datagram from a cellphone agent with the globally unique IP address assigned to the NAT router 22. Likewise, incoming packets from the internet addressed to the NAT router 22 have their destination addresses changed to the locally unique address of the cellphone to which the data packet is addressed. These incoming packets are routed to the appropriate one of the cellphones on the cellphone local area digital data network using an address translation table in the NAT router 22. The NAT routing table contains two items of information for each cellphone: the IP address of the host on the internet; and the internal IP address of the cellphone on the cellular provider's network. This table must be in place before the first incoming packet intended for a cellphone arrives at the NAT router. There are several possible embodiments for initializing (filling with address translation data) this NAT routing table.

1) Manual Initialization: A manager configures the translation table manually before any communication occurs. Port numbers in the TCP/IP packet headers can be used to distinguish between different cellphones as the destination.

2) Outgoing datagrams: The NAT routing table is built as a side-effect of sending datagrams from the cellphones to the collection server. When a datagram is received at NAT router 22 from one of the cellphones, a software process automatically makes a NAT routing table entry recording the local address of the cellphone and the globally unique IP address of the collection server. This alternative can only be used in embodiments where the agents initiate communication with the collection server before the collection server sends any packets to the cellphones. Such a class of embodiments includes an embodiment where a cellphone agent initiates a session with the collection server upon power up of the phone or at some other time and registers itself with the collection server.

3) Incoming Name Lookup: The NAT routing table is built as a side-effect of handling domain name lookups. When a host on the internet such as the collection server looks up the domain name of one of the cellphones to find its IP address, the domain name software creates an entry in the NAT translation table, and then answers the request by sending the globally unique IP address of the NAT router 22. Thus, to the servers on the internet, it appears that all cellphone host names in the cellular system map to the globally unique IP address of the NAT router 22.

The address of each cellphone must be accessible to the router 30 so that the data collection server 32 can communicate with each phone. In the preferred embodiment, each cellphone has a globally unique IP address and if the cellular provider uses NAT, each cellphone contract will include a surcharge to cause that cellphone to be assigned a globally unique IP address. In alternative embodiments where NAT is used by the cellular system provider, the collection server 32 communicates with each cellphone in the conventional manner in which all prior art NAT systems work.

The cellphone must have an agent program (or some operating system functionality which can perform the functions of the agent program described herein) which is resident in the preferred embodiment, or which can be downloaded, installed and launched remotely by the collection server 32 in other embodiments. Downloading, installation and remote launching of programs digitally is known in the prior art of head end apparatus downloading programs to digital set top boxes in DOCSIS digital data delivery cable systems. In the preferred embodiment, the IT department that gives a cellphone to an employee will manually install the agent program in the phone before delivering it. In other embodiments, the IT department can upload the agent program to a server of the cellphone provider. The server of the cellphone provider then sends TCP/IP packets to the particular cellphone which include an agent program. In the preferred embodiment, the cellphone provider server then sends a message to the phone upon which the agent is to be installed saying there is a new application the server would like to install on the phone. If the phone owner permits the installation by giving some command, the phone launches an installer program which downloads the agent program from the cellphone provider server and installs it. The installer program comes with the phone and is the same installer as is used to download and install games, ringers, etc. In other embodiments, the cellphone provider server just receives the message that the application may be installed and sends TCP/IP packets containing the agent program to the phone. These TCP/IP packets will be addressed to a port which signals the J2ME software (or whatever other operating system the phone has) in the phone to invoke an API function to invoke an installer program to receive the TCP/IP packets containing the agent program and install it in the phone in a resident state ready to be launched. In the preferred embodiment, the user of the phone is involved in the installation to answer yes or no to a query as to whether he wants the agent program to be installed. This embodiment is preferred because it prevents applications from being installed surreptitiously on the phone. In other embodiments, the agent program will be installed in the background and no user involvement or knowledge that a new application has been loaded is necessary.

In the preferred embodiment, the agent program or OS agent function is launched by the collection server 32 only when the server 32 wants to collect information. In the preferred embodiment, the agent or OS agent function will only run when the cellphone is not in use in making or receiving a call. Many cellphones can only run one program at a time. In alternative embodiments, where a cellphone can run multiple programs simultaneously, the agent can be launched at any time by the collection server. In still other alternative embodiments, the agent can be running in the background at all times and continuously collect information and send it to the collection server at the initiation of the agent by establishing a secure or non secure session over the internet with the collection server. In the preferred embodiment however, the initiation of a data collection session with an agent can only be initiated by the collection server.

Typically, each cellphone will have J2ME (Java 2 Micro Edition) software loaded in addition to whatever operating system or simple BIOS (Basic Input Output System) the manufacturer of the cellphone installs. Effectively, J2ME is the operating system. Hereafter, references to the operating system refer to the J2ME layer. J2ME is a Java Virtual Machine which presents an application programmatic interface (API) that allows certain functions to be invoked. Other operating systems will work to practice the invention also. For example, the BREW phone operating system from Qualcomm or Microsoft PocketPC operating system can also be used. Therefore, J2ME as a phone operating system or layer of functionality above the phone operating system is not a required element to practice the invention. However, there must be some software which presents an API which allows the phone functionality needed to practice the invention to be invoked. The API functions needed are as follows (some are optional).

1) Install and execute an installation program to load another program: in the preferred embodiment, software cannot be loaded without a human interacting with the phone. Typically, the agent program will be installed manually by the IT department. However, the agent program can also be downloaded over the RF digital data link and installed on the phone remotely. Typically, this requires permission from the operator of the phone, but in some embodiments, the agent program can be downloaded over the RF data link and installed on the phone remotely without the user of the phone knowing about it or having to give permission. Remote installation would be done by sending IP packets that contain the agent to the cellular provider server 24 along with a list of phones upon which the agent is to be installed. The provider's server 24 then sends messages to all the phones on the list and which need the agent program. Each user of such a phone receives the message and has to consent to loading of the agent. If the user consents, server 24 encapsulates the agent program into IP packets addressed to each phone which consents. These IP packets get routed to the phone by the router 22 in the network of the cellular service provider. When the IP packets get to the phone, they are passed up through the TCP/IP layers to the J2ME layer to invoke this install/execute API function to execute an install program and install the agent program encapsulated in the IP packet's payloads into the phone.

2) Network connectivity: this function establishes connectivity to a particular port by a program. For example, this function can be invoked when a program wants to listen for packets addressed to it from other programs. A program could invoke this function and pass the port number of the port it wants to listen to as part of the function call. The API function would then execute and establish the designated port as associated with the calling program so that packets addressed to that port would be passed to the calling program.

3) Remote invocation of a program: this is an underlying operating system function which on a specific port for a specific message will launch the agent program. An agent program on a particular phone can be launched by sending a datagram addressed to the phone's IP address (or local address in the case of NAT) and to a particular port which is dedicated to the agent program. Whenever a datagram or text message is received which is addressed to the phone and to this particular port, the operating system launches the agent program so that it can gather data from the phone and send it back to the collection server 32. The collection server 32 knows which IP address each cellphone has and knows which port the phone's operating system is listening to for a start message. When the agent program was installed, it registered itself with the operating system of the phone and designated the port. The operating system knows from this registration that whenever it receives a datagram or text message addressed to that port number of the phone that it must launch the agent program by invoking this remote invocation of program function call.

4) Access phone data: this function call allows the agent to gather information from the operating system or J2ME layer about the cellphone and its use including information on:
- phone make and hardware version information
- operating system software version information
- provider identity
- the existence or non existence of any virus protection software in the phone
- usage information
    call timers
    the included minutes or other plan the phone is on if that information is stored in the phone or the electronic serial number of the phone;
    the configuration file privileges such as web access, picture sending and receiving capability or other data reception sending and receiving capability of the phone
    list of incoming and outgoing calls or missed calls
    GPS location and possibly tracking of locations over time
    list of names and phone numbers in the phone's address book
- and whatever other information which can be gathered about the phone or its usage which would be a useful piece of information to manage a company's cellular phone program.

The agent program itself does not have an API in the preferred embodiment, but in other embodiments, the agent program or OS agent function could have its own API such as providing function calls that can be invoked to gather each specific different type of information.

The data collection process and apparatus described herein are self contained and does not rely on the cellphone provider's billing system or any other operation of the server of the cellphone provider. The only qualification to this statement is that some embodiments involve the cellphone provider's server to install agent programs over the radio frequency data transport process provided by the cellphone provider's network.

Figure 2:
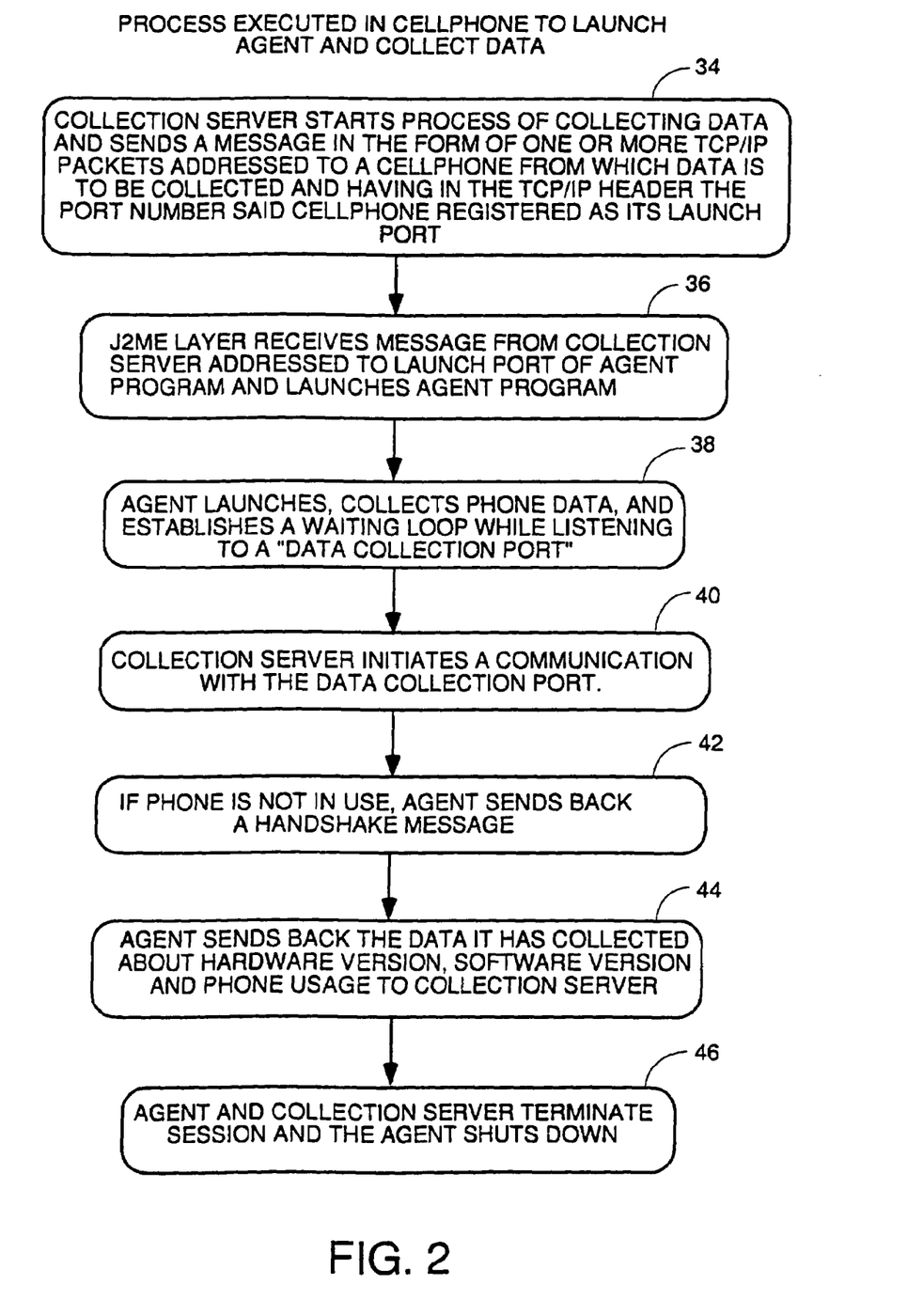
FIG. 2 is a flowchart of the process to remotely launch the agent program, collect data, send the data to the collection server and shut down.

Referring to FIG. 2, there is shown a flowchart of the process to remotely launch the agent program or OS agent function, collect data, send the data to the collection server and shut down. Before the process of FIG. 2 can be executed, an agent program has to be installed in the phone and must have registered with the operating system to identify a port. That port will be the port at which, if a message is received addressed to that port, the operating system will know to launch the agent.

At the beginning of the process of FIG. 2, the agent program has been previously installed but is not executing in the preferred embodiment. The teachings of the invention contemplate that the agent's functionality will eventually be incorporated as a function of the operating system which can be invoked through a procedure call to the operating system or through an API function call. Hereafter, any reference to the agent should be understood as also referring to operating system functionality which performs the functions of the agent program if no specific reference to OS agent function is made.

Step 34 represents the process of remotely launching the agent OS agent function. In step 34, the collection server starts the process of collecting data by sending a message in the form of one or more TCP/IP packets addressed to a cellphone from which data is to be collected. These one or more TCP/IP packets will have in their headers the port number which the agent program or OS agent function of the cellphone being addressed registered as its launch port. In step 36, the J2ME software layer receives the message from the collection server addressed to the launch port of the agent program or OS agent function and launches the agent program or OS agent function as a result by invoking the appropriate API function call.

In step 38, the agent or OS agent function launches and collects data about the phone hardware version, software version and usage. The agent or OS agent function also establishes a waiting loop while listening to a data collection port. This port number is known to both the collection server and the agent or OS agent function. In the preferred embodiment, the data collection port is specified by the agent program when it registers with the operating system upon being installed along with the launch port. The launch port is the port which, if any message is received which is addressed to the launch port, the agent program or OS agent function will be launched. In alternative embodiments, the data collection port can be established by a handshake protocol between the agent program or OS agent function and the collection server. In some embodiments, the data collection port number is known to the collection server because all agents register the same port number with their operating systems. In other embodiments, the agent program or OS agent function will send a message to the collection server after it has registered telling the collection server which port has been assigned as the data collection port. In this embodiment, the collection server must have a public IP address or be in the same network with the cellphone provider's servers.

There are three different species for collection of data by the agent program or OS agent function. In the preferred species, illustrated in FIG. 2, the agent program or OS agent function launches and then waits while listening to the data collection port for messages from the data collection server. These messages are addressed to the data collection port and requests the agent program or OS agent function to send back all the data it has collected about the phone. In the preferred embodiment, the agent or OS agent function collects whatever data it can collect when it launches and then waits for the collection server to ask for all the data it has. In another embodiment, these messages sent by the data collection server to the phone's data collection port specify exactly which data the collection server wishes to collect, and the agent or OS agent function collects only that data. In a third embodiment, these messages specify what data the collection server wants to collect, and the agent or OS agent function collects all the data it can collect but only sends back the data which the collection server asks for.

In step 40, the collection server 32 uses the public IP address of the cellphone from which it desires to collect data and sends a message to that IP address with the data collection port number in the TCP/IP packet headers. It is possible that multiple data collection servers who have the IP address of the cellphone will all try to collect information from the phone. In the preferred embodiment, only the collection servers can initiate communications with the cellphone to collect data, and not the other way around. The server will try to establish communications with the phone for some predetermined amount of time, and if communications are not successfully established, the server process will time out and the data collection effort will be put in failed status and may be rescheduled for later.

In step 42, communication will be established by the agent or OS agent function if the phone is not in use by the agent receiving the message sent by the collection server to the data collection port and sending back a handshake message. In alternative embodiments, the handshake can be dispensed with. In other embodiments where the phone is multithreading and other concerns such as privacy do not preclude it, the agent or OS agent function can be launched even when the phone is in use. In some embodiments, the agent or OS agent function can be launched while the phone is in use and can collect phone data while the phone is in use. In still other embodiments, the agent or OS agent function launches itself automatically when the phone is in use, and part of the data collected is the phone conversation held on the phone. The phone conversations is stored in digital, compressed form in a file stored on the phone until the collection server initiates a data collection session.

In step 44, the agent process or OS agent function sends back to the collection server the data it has gathered about the phone hardware version, the software version, phone usage and whatever other information the agent or OS agent function has gathered. In other embodiments, the agent or OS agent function does not just automatically gather all the information it can gather but waits to receive a message in step 40 from the collection server specifying which information the collection server wants and then just gathers that information and sends it back in step 44.

The collected data can be in any format such as fields separated by delimiters or a concatenation of fields each of a defined length with the entire file marked by delimiters at the beginning and end. The transport mechanism is the native mechanism used by J2ME (or whatever other operating system is present in the phone) and the cellular system provider, such as IP packets which are parsed and encoded into symbols with forward error correction techniques and then code division multiplexed.

In step 46, the agent or OS agent function and collection server terminate the session and the agent shuts down so as to conserve phone resources.

Figure 3:
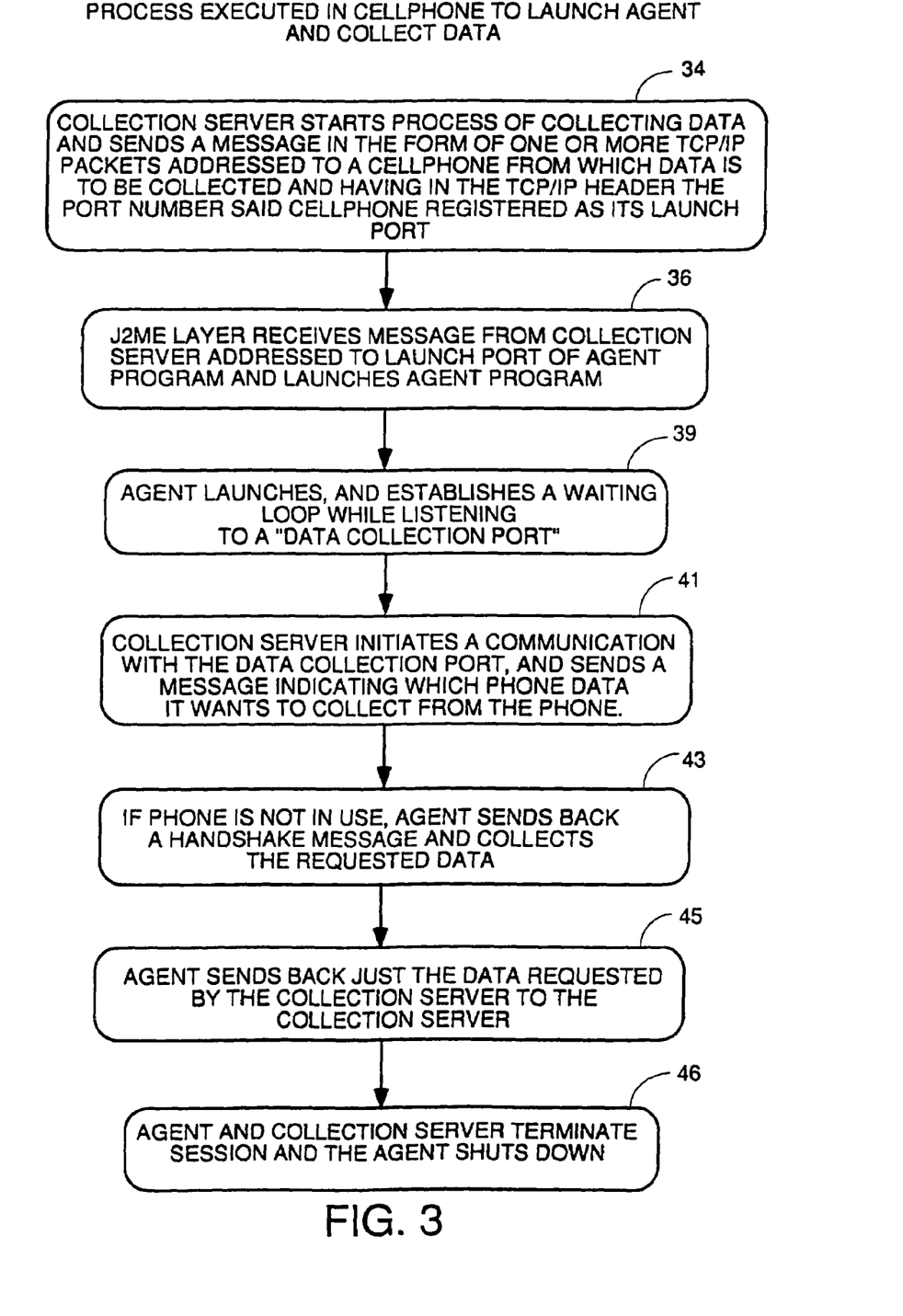
FIG. 3 is a flowchart of the process carried out in the phone when the agent is told what to collect by the collection server and collects only that information and sends it back to the collection server.

FIG. 3 is a flowchart of the process carried out in the phone when the agent or OS agent function is told what to collect by the collection server and collects only that information and sends it back to the collection server. All steps that have identical reference numbers to steps in FIG. 2 are the same. Step 39 differs from step 38 in FIG. 2 in that the agent or OS agent function launches and does not immediately gather all the available information about the phone as it does in the embodiment of FIG. 2. Instead, the agent or OS agent function just launches and goes into a waiting loop waiting for requests for specific data from the collection server. In step 41, the collection server attempts to establish communication with the cellphone by sending a message to the data collection port of the cellphone. That message specifies which information the collection server wants to collect. In step 43, the agent or OS agent function sends back a handshake message if the phone is not in use, and collects the requested data from the cellphone's operating system. In step 45, the agent or OS agent function sends back just the data requested by the collection server which was collected in step 43 to the collection server. Thereafter, the session is terminated and the agent or OS agent function shuts down.

Figure 4:
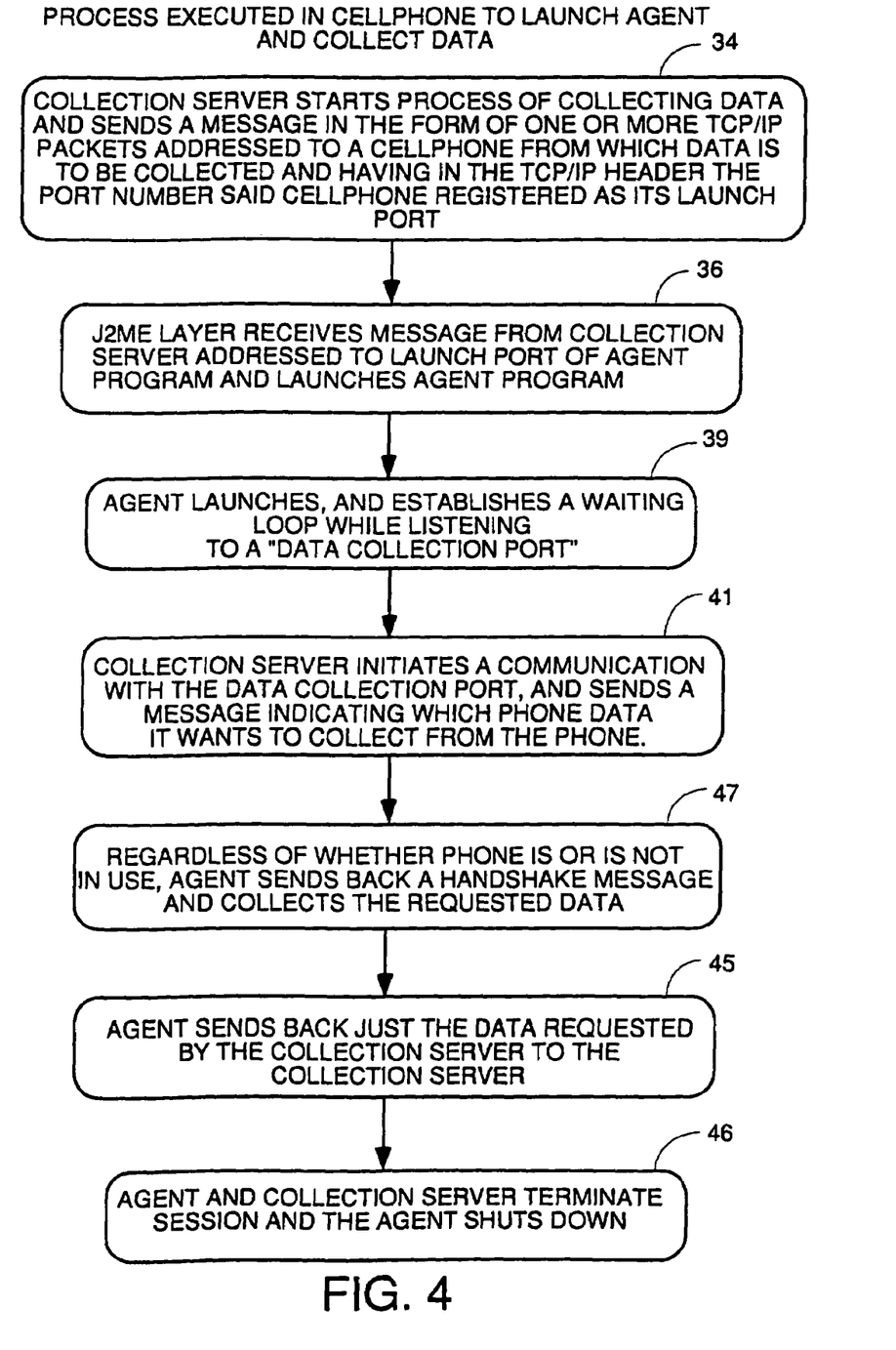
FIG. 4 is a flowchart of another embodiment of a process carried out in the cellphone to launch the agent and collect information but differing in that the agent can be launched and collect data and send that data to the collection server even while the phone is in use.

FIG. 4 is a flowchart of another embodiment of a process carried out in the cellphone to launch the agent or OS agent function and collect information but differing in that the agent or OS agent function can be launched and collect data and send that data to the collection server even while the phone is in use. Steps which have the same reference numbers as steps in FIG. 3 have the same function and operation. The difference over the embodiment of FIG. 3 is in step 47. There, the agent or OS agent function sends back a handshake message to the collection server in response to the collection server initiating a data gathering session, and this happens regardless of whether the phone is in use or not. In the preferred embodiment, the J2ME software is multithreading and has the capability to do this so this embodiment can be practiced in a J2ME phone or any other phone with multithreading ability of its operating system.

The embodiment of FIG. 4 carries out a process where the collection servers specifies just the data it wants and the agent or OS agent function collects only that data.

Figure 5:
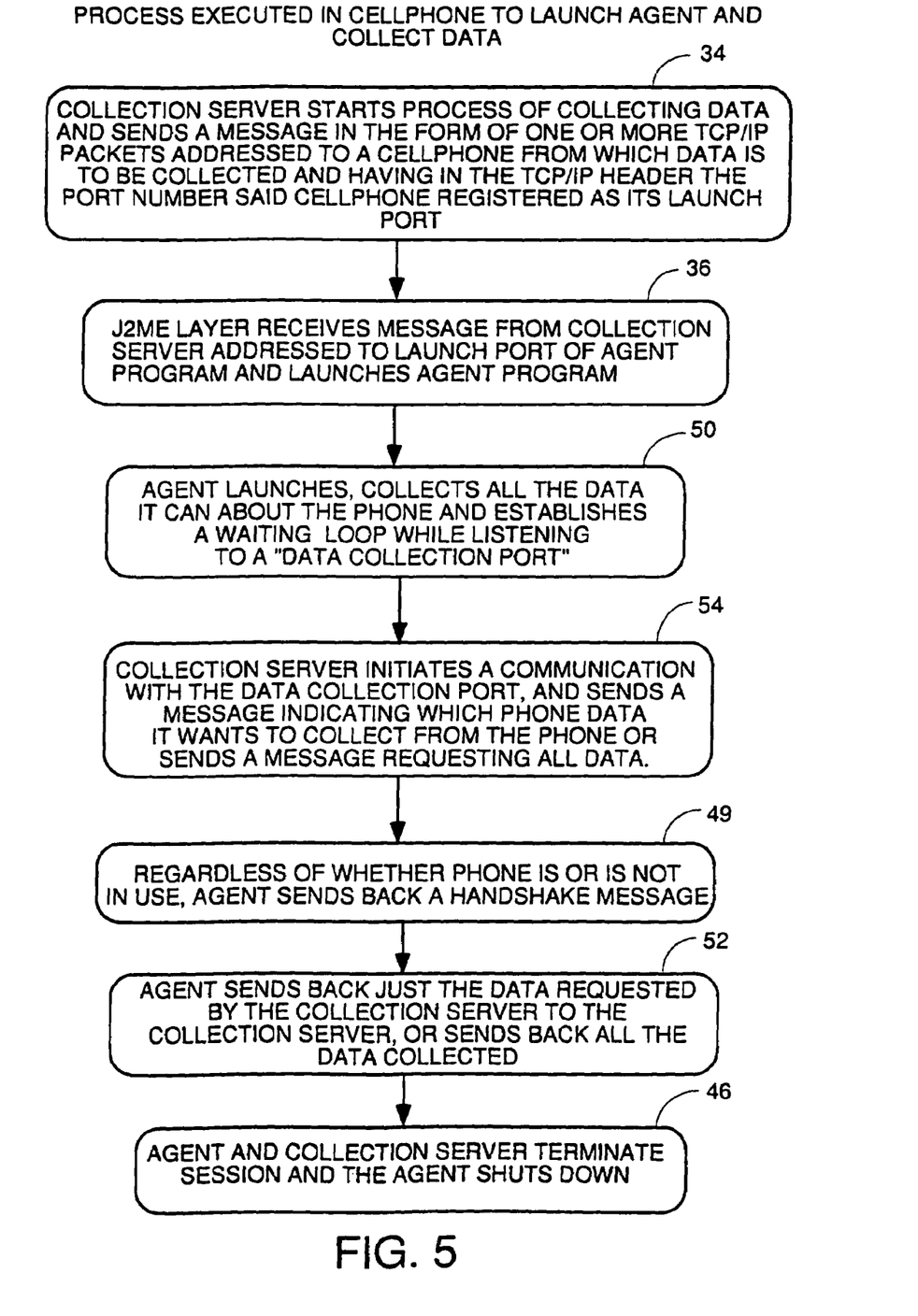
FIG. 5 is a flowchart of another species of a process carried out in a cellphone like FIG. 4 but the agent collects all available data and reports it all or just the data requested.

In the alternative embodiment represented by FIG. 5, the agent or OS agent function collects all the possible data in step 50. The collection server in step 54 establishes a data collection session with the phone and either sends a message requesting certain pieces of information be sent or sends a message requesting all the collected data be sent. The agent or OS agent function then sends all the collected data to the collection servers in step 52 or just the data specified by the collection server in the case where the collection server specified exactly which data about the phone it wanted. All other steps with identical reference numbers to steps in FIG. 4 have the same function and operation.

Figure 6:
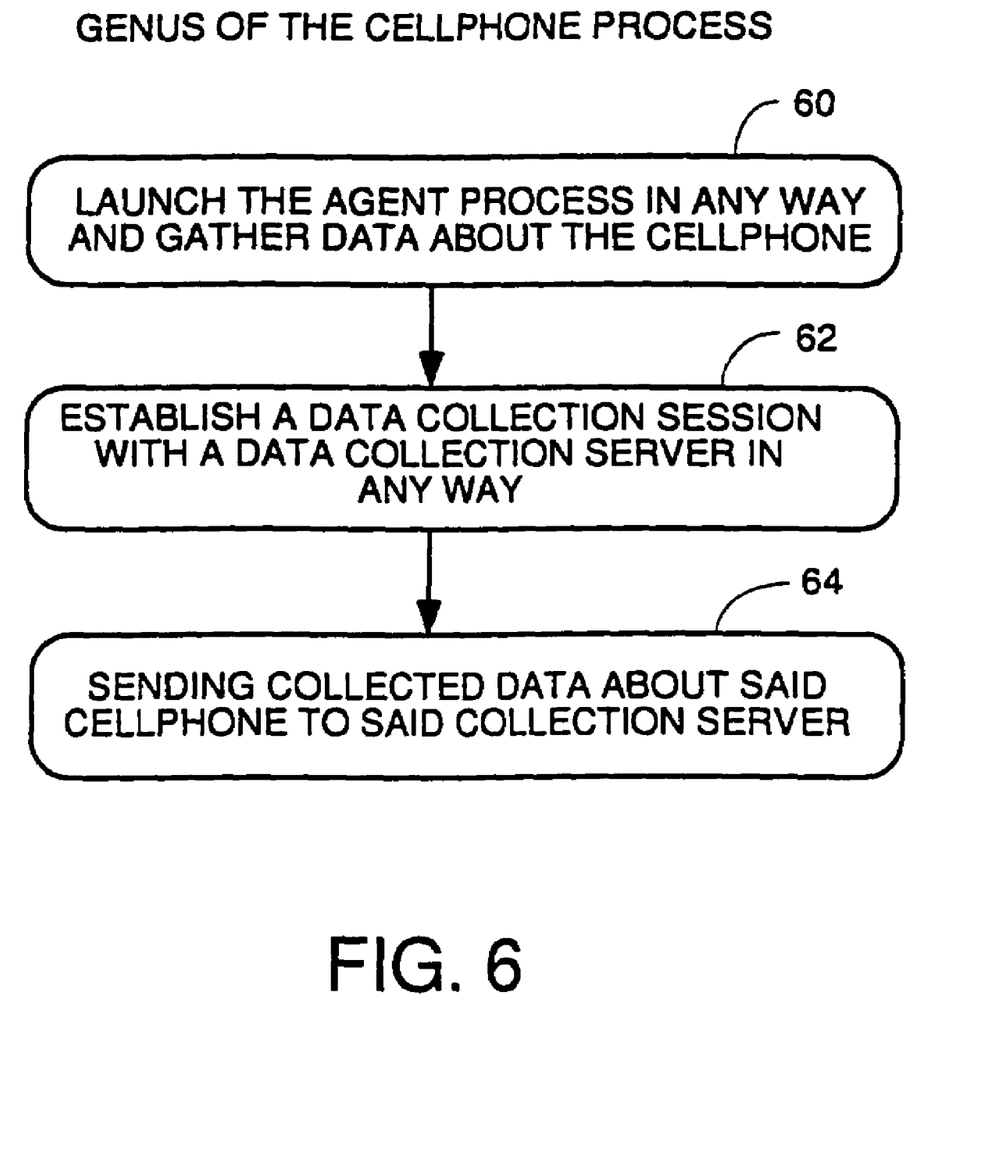
FIG. 6 is a flowchart of the genus of the cellphone process.

Referring to FIG. 6, there is shown a flowchart of the genus of the cellphone process. In step 60, the agent or OS agent function is launched in any way. In some species, it will be launched in the manner described in FIGS. 2-5 using a launch port. In other embodiments, the agent or OS agent function will be in execution at all times the phone is powered on. In still other embodiments, the agent or OS agent function launches itself whenever the phone is used to make a call or receive a call or do any other function. Step 62 represents the process of establishing a data collection session between the cellphone and the data collection server in any way. In some species it can be only initiated by the data collection server. In other embodiments, it can be initiated by the cellphone itself, such as whenever it has data to send, and where the data collection server has a public IP address. In step 64, collected data about the cellphone is sent to the data collection server for storage in a database. This can be done in anyway such by use of datagrams or by a File Transfer Protocol.

Figure 7:
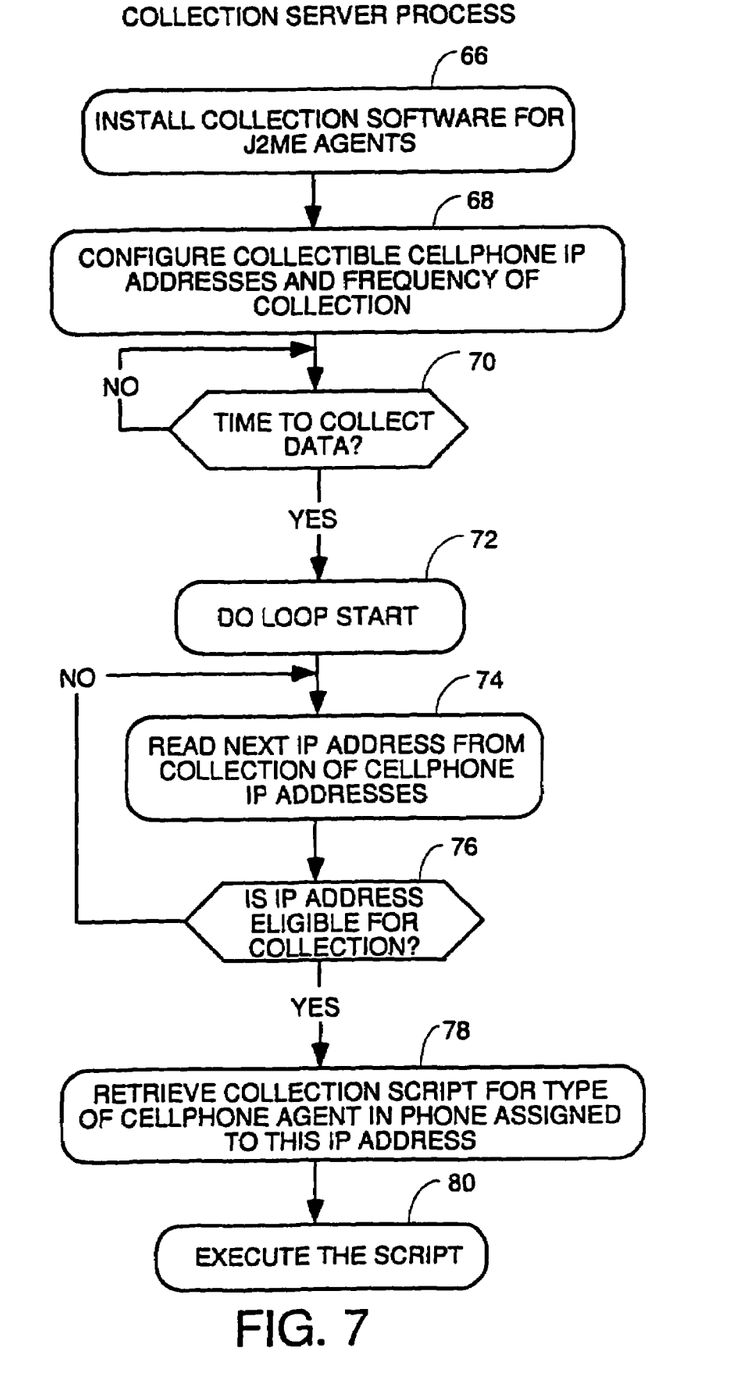
FIG. 7 is a flowchart of the preferred embodiment of a process to run on the server.

Referring to FIG. 7, there is shown a flowchart of the preferred embodiment of a process to run on the server. Step 66 is really a preliminary step of installing the collection software and the collection scripts for J2ME agents or OS agent functions. The collection software does the steps that follow the installation and configuration steps 66 and 68. Step 68 is another preliminary step which involves configuring a configuration file or database stored in nonvolatile memory to add the IP addresses of the cellphones from which data is to be collected and defining a frequency of collection and any restrictions such as do not collect during morning hours in this user's time zone or do not collect during commute times when the phone is likely to be busy.

Step 70 is the first step of the collection process. This step checks the time and determines if it is time to begin a collection cycle. If not, the system idles until it is or does other tasks.

If it is time to collect data, processing calls a do loop routine which starts at 72. The first step of this routine is to read the next IP address from the list of IP addresses assigned to the cellphones being monitored, as symbolized by step 74. Test 76 reads the restrictions associated with this IP address and determines if the IP address is eligible for collection. If not, step 74 is performed again to read the next IP address from the group of addresses of cellphones. If the IP address is ready for collection, step 78 is performed to retrieve a collection script for the type of cellphone agent or OS agent function which has been installed in the cellphone assigned to this IP address. There are many different type of collection scripts for different computers and operating systems in the company and different types of cellphones.

In step 80, the script is executed. This involves launching the agent or OS agent function by creating and sending a datagram message addressed to the cellphone's public IP address and to the launch port of the cellphone. Next, the collection script trys to establish a collection session with the cellphone by sending a datagram to the collection port for some specified timeout period. If a collection session is established, and a handshake is received, the collection script receives the collected data, parses it and stored it in a database or other repository on the collection server.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A process carried out in a cellphone, comprising:
   1) listening for a message addressed to said cellphone and having a predetermined launch port included in the header data of said message;
   2) launching an agent program or an OS agent function into execution when such a message is received;
   3) monitoring a data collection port for receipt of a message addressed to said data collection port indicating a data collection session is to be started; and
   4) when such a message addressed to said data collection port is received, gathering data about said cellphone and sending it back to said collection server.

2. The process of claim 1 wherein step 2 is carried out only if the phone is not in use.

3. The process of claim 1 wherein step 2 is carried out regardless of whether the phone is in use or not.

4. The process of claim 1 wherein step 4 comprises gathering by said agent program or OS agent function of all available data that can be gathered about a cellphone and sending all gathered data back to said collection server.

5. The process of claim 1 wherein step 4 comprises gathering by said agent or OS agent function of only available data that can be gathered about a cellphone and which is specified in a message received from said collection server.

6. The process of claim 1 wherein step 4 comprises gathering by said agent or OS agent function of all available data that can be gathered about a cellphone but sending back to said collection server only items of gathered data specified in a message from said collection server.

7. The process of claim 1 where step 3 further comprises sending back a handshake message when a message addressed to said data collection port is received.

8. The process of claim 1 further comprising preliminary steps performed before step 1 is performed of installing said agent program on said cellphone and registering said agent program with an operating system of said phone and designating said launch port and said data collection port upon registration.

9. The process of claim 1 further comprising preliminary steps performed before step 1 is performed of installing said agent program on said cellphone and registering said agent program with an operating system of said phone and designating said launch port and wherein step 3 further comprises the preliminary step of establishing the identity of said data collection port in a handshake protocol between said agent program and said data collection program.

10. The process of claim 1 wherein step 1 comprises listening for a message addressed to a public IP address assigned to said cellphone.

11. A process carried out in a cellphone comprising:
   receiving a message from a collection server which is addressed to a launch port which has been designated by an agent program or OS agent function as a port which, if any message is received addressed to said port, said agent program or OS agent function is supposed to be launched;
   launching said agent program or said OS agent function;
   said agent program or OS agent function executes and collects data from said cellphone and establishes a waiting loop to listen for messages at a predetermined data collection port;
   receiving a message from a data collection server addressed to said data collection port;
   determining if said cellphone is in use to make a call or receive a call, and, if not, sending a message from said agent program or OS agent function back to said collection server to establish a handshake and a data collection session;
   sending back to said collection server all data about said cellphone collected by said agent program or OS agent function; and
   terminating said data collection session and shutting said agent program or OS agent function down.

12. A process carried out in a cellphone comprising:
   receiving a message from a collection server which is addressed to a launch port which has been designated by an agent program or OS agent function as a port which, if any message is received addressed to said port, said agent program or OS agent function is supposed to be launched;
   launching said agent program or OS agent function;
   said agent program or OS agent function executes and collects data from said cellphone and establishes a waiting loop to listen for messages at a predetermined data collection port;
   receiving a message from a data collection server addressed to said data collection port;
   determining if said cellphone is in use to make a call or receive a call, and, if not, sending a message from said agent program or OS agent function back to said collection server to establish a handshake and a data collection session;
   sending back to said collection server just data about said cellphone collected by said agent program or OS agent function which said collection server asked for; and
   terminating said data collection session and shutting said agent or OS agent function down.

13. A process carried out in a cellphone comprising:
   receiving a message from a collection server which is addressed to a launch port which has been designated by an agent program or OS agent function as a port which, if any message is received addressed to said port, said agent program or OS agent function is supposed to be launched;

launching said agent program or OS agent function;

said agent program or OS agent function executes and establishes a waiting loop to listen for messages at a predetermined data collection port;

receiving a message from a data collection server addressed to said data collection port, said message indicating which data about said cellphone said data collection server would like to collect;

regardless of whether or not said cellphone is in use to make a call or receive a call, sending back a handshake message to said collection server to establish a handshake and a data collection session, and gathering the data about said cellphone established in said message from said collection server received at said data collection port;

sending back to said collection server data about said cellphone collected by said agent program or OS agent function; and terminating said data collection session and shutting said agent or OS agent function down.

14. A process carried out in a cellphone comprising:

receiving a message from a collection server which is addressed to a launch port which has been designated by an agent program or OS agent function at a port which, if any message is received addressed to said port, said agent program or OS agent function is supposed to be launched;

launching said agent program or OS agent function;

said agent program or OS agent function executes and collects all available data about said cellphone, and establishes a waiting loop to listen for messages at a predetermined data collection port;

receiving a message from a data collection server addressed to said data collection port, said message indicating which data about said cellphone said data collection server would like to collect or indicating that all collected data about said cellphone is to be sent by the agent program or OS agent function to said data collection server;

regardless of whether or not said cellphone is in use to make a call or receive a call, sending back a handshake message to said collection server to establish a handshake and a data collection session;

sending back to said collection server all the data about said cellphone collected by said agent program or OS agent function or just the data requested by said collection server, according to said message received from said collection server; and terminating said data collection session and shutting said agent or OS agent function down.

15. A computer-readable medium having computer-executable instructions thereon for controlling a cellphone computing device to carry out the following process:

1) listening for a message addressed to said cellphone and having a predetermined launch port included in the header data of said message;

2) launching an agent program or OS agent function into execution when such a message is received;

3) monitoring a data collection port for receipt of a message addressed to said data collection port indicating a data collection session is to be started; and 4) when such a message addressed to said data collection port is received, gathering data about said cellphone and sending it back to said collection server.

16. A cellphone apparatus having a microprocessor controlled by an operating system and a J2ME Java Virtual Machine software layer and further programmed to carry out the following process:

1) listening for a message addressed to said cellphone and having a predetermined launch port included in the header data of said message;

2) launching an agent program or OS agent function into execution when such a message is received;

3) monitoring a data collection port for receipt of a message addressed to said data collection port indicating a data collection session is to be started; and 4) when such a message addressed to said data collection port is received, gathering data about said cellphone and sending it back to said collection server.

17. The apparatus of claim 16 wherein said microprocessor is programmed to carry out step by gathering all available data about said cellphone, and sending all gathered data back to said collection server.

18. The apparatus of claim 16 wherein said microprocessor is programmed to carry out step by gathering only data about said cellphone specified by said data collection server, and sending all gathered data back to said collection server.

* * * * *